W. W. BLAKELY.
ANCHORING DEVICE FOR WHEELED VEHICLES.
APPLICATION FILED JAN. 25, 1919.
1,401,389.
Patented Dec. 27, 1921.
2 SHEETS—SHEET 1.
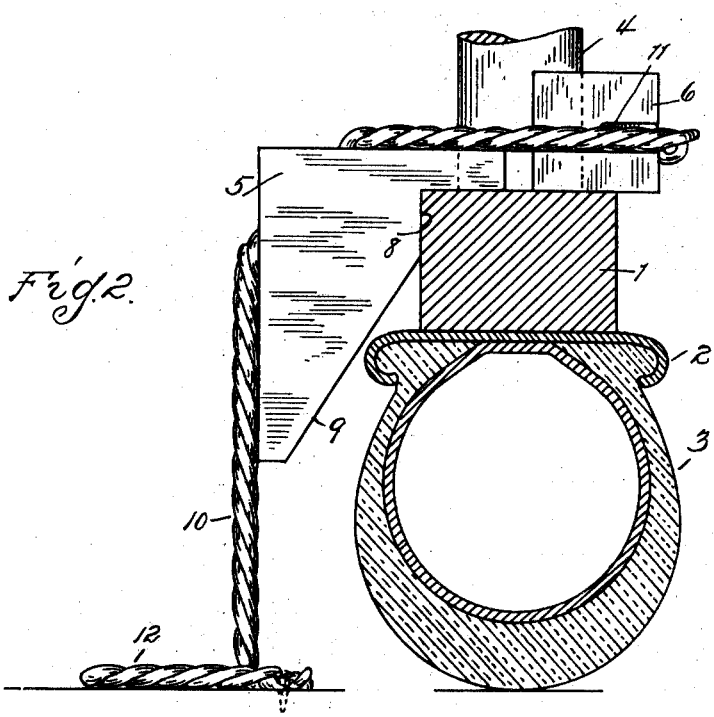
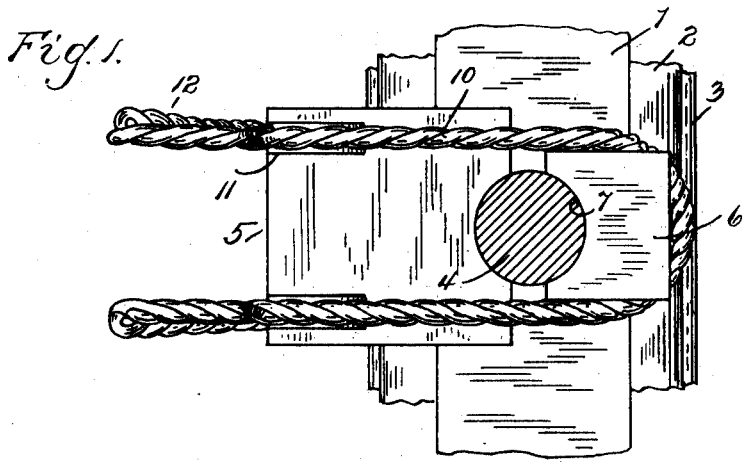
Inventor
William W. Blakely
By Whittemore, Hulbert, and Whittemore
Attorneys

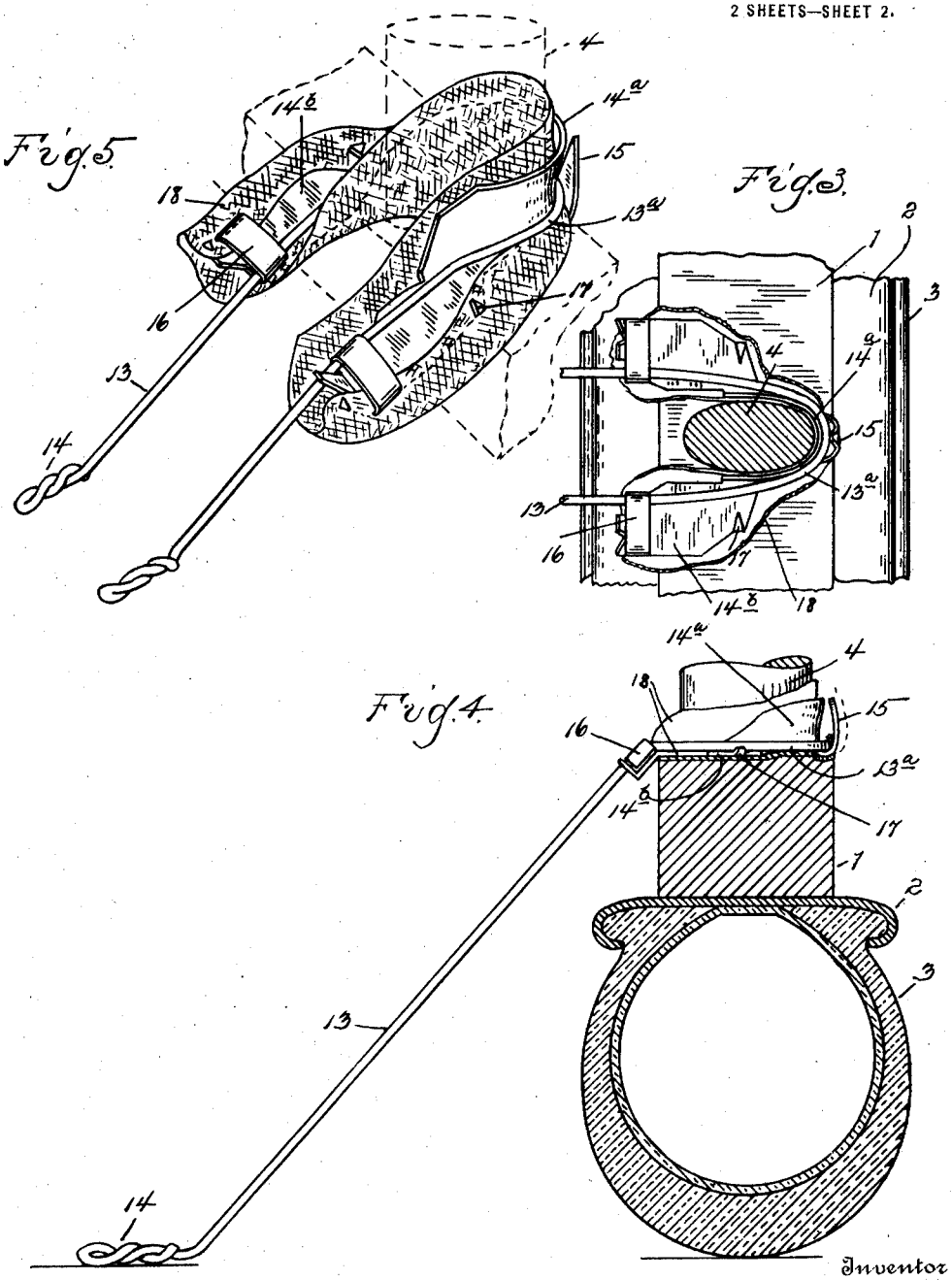

UNITED STATES PATENT OFFICE.

WILLIAM W. BLAKELY, OF DETROIT, MICHIGAN.

ANCHORING DEVICE FOR WHEELED VEHICLES.

1,401,389.   Specification of Letters Patent.   Patented Dec. 27, 1921.

Application filed January 25, 1919. Serial No. 273,157.

*To all whom it may concern:*

Be it known that I, WILLIAM W. BLAKELY, a citizen of the United States of America, residing at Detroit, in the county of Wayne and State of Michigan, have invented certain new and useful Improvements in Anchoring Devices for Wheeled Vehicles, of which the following is a specification, reference being had therein to the accompanying drawings.

The invention relates to anchoring devices for vehicles and relates particularly to devices engageable with the wheels of a vehicle to anchor the same during shipment.

The object of the invention is to provide an anchorage device, as a rod or wire or other suitable member engageable with a spoke of the vehicle wheel and employing one or more bearing members providing a relatively large surface engageable with the spoke to prevent said rod or wire cutting or marring the spoke. Other features of the invention lie in the means employed to prevent disengagement of the bearing member from the anchoring rod or wire and for attaching a pad-forming fabric to the bearing to be interposed between the same and the spoke.

The invention is illustrated in preferred forms in the accompanying drawing, wherein—

Figure 1 is a plan view of the anchorage device engaged with the spoke of a vehicle wheel;

Fig. 2 is a view of the same in side elevation;

Fig. 3 is a top view of a modified form of the invention engaged with the spoke of a wheel;

Fig. 4 is a side elevational view of the same;

Fig. 5 is a perspective view of the modified construction.

In these views the reference character 1 designates the felly of a vehicle wheel, 2 the rim, 3 a tire upon the rim, and 4 one of the spokes. In proximity to the felly 1, bearing members 5 and 6 are engaged with the spoke 4 at each side thereof, said members being preferably formed of wood or some similar non-metallic substance. The opposed faces of the members 5 and 6 are channeled, as indicated at 7, to partially embrace the spoke 4. The member 6, which is relatively small, engages only the inner face of the felly 1, while the member 5 is formed with faces 8 engaging both the inner face of the felly and a lateral face thereof. The outer portion of the block 5 is tapered, as indicated at 9, giving it clearance from the rim 2 and tire 3. The anchoring member 10 is formed preferably of two-ply twisted wire, intermediately return-bent and having corresponding leg portions extending from the return-bend, which are similarly intermediately bent at substantially a right angle. Between the return-bend of the anchoring member and the spoke 4, the member 6 is inserted, the return-bend being engaged in grooves 11 cut or otherwise formed in the corners of the member 6. Similarly the member 5 has a pair of grooves 11 in the edge thereof, over which the legs of the anchoring member are bent, said member being engaged in said grooves. The grooves 11 of the block 6 restrain said block against displacement longitudinally of the spoke, while the grooves 11 of the member 5 restrain said member against displacement parallel to the felly 1. The extremities of the legs 10 are respectively looped to form feet 12, engageable by nails or suitable fastening means for securing the anchoring device to the floor or other surface against which the wheel 1, 2, 3, 4 bears. The bearing members 5 and 6 protect the wheel against injury, such as might occur if contact of the metallic member 10 with the spoke or felly were permitted, said members providing a relatively large bearing surface established by a substance of relatively soft material so that severe strains may be taken care of by the anchoring means without marring the wheel or injuring its finish.

In the modified construction illustrated in Figs. 3 to 5 inclusive a somewhat similarly shaped anchoring member 13 is formed, said member in this instance, however, being formed of only a single strand of wire 13, the same being return-bent at $13^a$ to embrace the spoke 4 and having loops 14 at the extremities of its legs to permit the same to be secured to the surface upon which the wheel rests. Between the return-bend $13^a$ and the spoke, there is interposed a guard formed of sheet metal and comprising a semi-circular portion $14^a$ for engagement with the spoke and integral lateral projections $14^b$ for engagement with the felly of the wheel. Upon the portion $14^a$ there is formed a tongue 15 bent into proximity to said portion and engaging the return-bend 13ᵃ to hold the guard member in position relative to said return-bend. A similar function is performed by tongues 16 respectively formed on the parts 14ᵇ of the guard member and similarly bent into proximity to said parts. Also each of the members 14ᵇ is formed with a sharp prong 17, which prongs coöperate with the tongues 15 and 16 to attach to the guard member of fabric pad 18, portions of which are adapted to be interposed between the guard member and the spoke 4 and the felly 1 so as to prevent said spoke and felly from being cut or scratched by the metal guard.

Thus, it is seen that in the modified construction the tongues 15 and 16 perform the double function of retaining the guard member in proper engagement with the anchoring wire securing the padding fabric 18 to the guard member. In both forms of the invention an attachment of the wheel to the surface on which it rests or bears is established in such a manner as to withstand a considerable strain without resultant injury to the wheel.

It is to be noted that the members providing the relatively large spoke engaging surfaces may in either form of the invention be manufactured of a standard shape and size for use with securing members (such as 10 or 13) of various lengths and shapes according to the strains to be provided for.

What I claim as my invention is:

1. An anchoring device for wheeled vehicles comprising a member intermediately return-bent to embrace a wheel spoke and legs at each side of said return-bent extending at an angle to the return-bent portion and terminating in feet engageable with a surface to form an attaching means.

2. An anchoring device for wheeled vehicles comprising a metallic member intermediately return-bent to embrace the spoke of a wheel, and forming legs at each side of said return-bend extending at an angle to the return-bent portion forming anchoring means for the device, and a member formed of relatively soft material interposed between said return-bend and the embraced spoke.

3. An anchoring device for wheeled vehicles comprising a member having a relatively wide bearing on the spoke of a wheel and a metallic member return-bent to embrace said bearing member and having legs at each side of the return-bend forming anchoring means for the device.

4. An anchoring device for wheeled vehicles comprising a metallic member intermediately return-bent to embrace the spoke of a wheel and forming legs at each side of said return-bend extending to form anchoring means for the device, and a member formed of relatively soft material interposed between said spoke and the return-bend and having a connection with the return-bend retaining it against displacement.

5. An anchoring device for wheeled vehicles comprising a bearing member shaped to embrace the spoke of a vehicle wheel, and a metallic member having a return-bent portion embracing said bearing member, and legs correspondingly projecting from said return-bent portion to form an anchoring means for the device.

6. An anchoring device for wheeled vehicles comprising a bearing member shaped to embrace the spoke of a vehicle wheel, and a metallic member having a return-bent portion embracing said bearing member, and legs correspondingly projecting from said return-bent portion to form an anchoring means for the device, the return-bent portion of the metallic member being transverse to the spoke and the legs thereof transverse to said return-bent portion.

7. An anchoring device for wheeled vehicles, comprising a relatively wide bearing portion for engaging a spoke and felly of a wheel, and a pair of legs extending therefrom terminating in securing means.

8. An anchoring device for wheeled vehicles comprising a portion adapted to engage a relatively wide space on the spoke and felly of a vehicle wheel, a metallic member embracing said portion and bent to form attaching means for the device.

9. A wheel anchoring device comprising a spoke engaging member and a tie member loosely carrying the spoke engaging member at one end and provided with securing means at its other.

10. A wheel anchoring device comprising an arched tie member, securing means carried by the feet of said tie member, and a spoke engaging member embraced by and loosely mounted upon the closed end portion of the tie member.

11. A wheel anchoring device comprising an arched tie member and a spoke engaging member embraced by and loosely mounted upon the closed end portion of said tie member, and lateral projections oppositely extending from said spoke engaging member for bearing upon the felly of a vehicle wheel.

12. A wheel anchoring device comprising an arched tie member, and a clamping collar embraced by the closed end portion of said tie member and proportioned to engage a spoke, said collar having retaining means at opposite sides thereof loosely receiving the embracing portion of the tie member.

13. A wheel anchoring device comprising a padded clamping member adapted to engage the spoke and felly of a vehicle wheel, a tie member adapted to engage said clamping member and means on the clamping member for retaining said tie member in loose engagement therewith.

14. A vehicle securing device comprising an arch-shaped tie member having leg portions and a connecting portion, and a sheet metal bearing member bent to engage the connecting portion and the upper parts of the legs of said tie member.

15. A wheel anchoring device comprising a wheel engaging member and a tie member loosely carrying the wheel engaging member at one end and provided with securing means at its other.

16. A wheel anchoring device comprising an arched tie member, securing means carried by the feet of said tie member and a wheel engaging member embraced by and loosely mounted upon the closed end portion of the tie member.

17. A wheel anchoring device comprising an arched tie member and a clamping member embraced by the closed end portions of said tie member and adapted to engage a wheel, said clamping member having retaining means at opposite sides thereof loosely receiving the embracing portion of the tie member.

18. A wheel anchoring device comprising a clamping member adapted to engage a vehicle wheel, a tie member adapted to engage said clamping member and means on the clamping member for retaining said tie member in loose engagement therewith.

In testimony whereof I affix my signature.

WILLIAM W. BLAKELY.